US005525246A

United States Patent [19]

Kamiya et al.

[11] Patent Number: 5,525,246
[45] Date of Patent: Jun. 11, 1996

[54] SLIDING-BEARING MATERIAL

[75] Inventors: Souzi Kamiya; Yoshio Kumada; Kenichiro Futamura, all of Aichi, Japan

[73] Assignee: Taiho Kogyo Co., Ltd., Aichi, Japan

[21] Appl. No.: 200,565

[22] Filed: Feb. 22, 1994

Related U.S. Application Data

[63] Continuation of Ser. No. 842,158, filed as PCT/JP91/00986, Jul. 24, 1991, published as WO92/01872, Feb. 6,1992, abandoned.

[30] Foreign Application Priority Data

Jul. 24, 1990 [JP] Japan ....................... 2-195672

[51] Int. Cl.$^6$ ............. C10M 103/00; F16C 33/12
[52] U.S. Cl. ................. 252/12; 252/25; 252/28; 252/29; 252/31; 252/51.5 A
[58] Field of Search ............. 252/12, 12.2, 18, 252/21, 22, 23, 25, 28, 29, 51.5 A, 31; 428/545, 539.5

[56] References Cited

FOREIGN PATENT DOCUMENTS

| 58-81220 | 5/1983 | Japan . |
| 60-1424 | 1/1985 | Japan . |
| 60-172770 | 9/1985 | Japan . |
| 63-172019 | 7/1988 | Japan . |

*Primary Examiner*—Prince Willis, Jr.
*Assistant Examiner*—Alan D. Diamond
*Attorney, Agent, or Firm*—Armstrong, Westerman, Hattori, Mcleland & Naughton

[57] ABSTRACT

A sliding-bearing material having enhanced seizure resistance and fatigue resistance. The sliding-bearing material comprises an aluminum bearing alloy whose surface has been treated and a coating layer formed on the aluminum bearing alloy and consisting of from 90 to 55% by weight of a sold lubricant and from 10 to 45% by weight of a polyimide binder. Treatment of the aluminum bearing alloy can be by roughening with alkali etching and pickling, by covering with a chemical conversion film, and/or by drilling.

16 Claims, 1 Drawing Sheet

SLIDING-BEARING MATERIAL

This application is a continuation of application Ser. No. 07/842,158, filed as PCT/JP91/00986, Jul. 24, 1991, published as WO92/01872, Feb. 6, 1992, now abandoned.

TECHNICAL FIELD

The present invention relates tea sliding material, and more particularly, to an aluminum-bearing sliding material with a resin coating, which is used for the sliding bearings of an automobile engine.

BACKGROUND ART

Kelmet, a soft alloy on whose surface a Pb based overlay-alloy is plated, is widely used for sliding bearings for automobiles.

On the other hand, resin-coated bearing materials are also known. Japanese Unexamined Patent Publication No. 60-1424 proposes a sliding bearing in which solid lubricants such as molybdenum disulfide, tungsten disulfide and graphite are bonded by phenol resin, polyamide imide resin and the like on uneven surfaces formed on the iron, copper or aluminum-based backing metal. Alusil alloy is shown as an embodiment of the aluminum-based metal.

Bearings with a coating consisting of a solid lubricant are also known. Japanese Unexamined Patent Publication No. 58-81220, is related to an application of the present applicant and proposes a thrust bearing. In this bearing, a solid-lubricant film is formed on the metallic blank material or on the manganese phosphate or soft nitriding coating applied on the metallic blank material having enough strength, such as carbon steel (SPCC) and aluminum alloy which contains as an alloying element one or more of 0–10% of Sn, 0–5% of In and 0–5% of Pb, and 0–3% of Cu and/or Mg, and 10% or less of one or more of Cr, Si, Mn, Sb, Fe, and Ni as an optional element.

Recently automobile engines have achieved outstanding high performance through high power and high rotation. The conventional kelmet alloy with the overlay satisfies the compatibility for the high performance engines, but incurs the problem that the lubricating oil deteriorates to form corrosive media, by which the overlay is liable to be attacked. Application of an overlay on the aluminum alloy has been considered as a measure to enhance compatibility, but the problem of poor corrosion-resistance then arises. An intermediate layer consisting of metal with excellent adhesion, such as Cu, Ni and the like, is formed on the lining (bearing alloy) when the overlay is applied. The intermediate layer itself has a poor friction property and is thus disadvantageous lo in the light of seizure.

The compatibility of an overlay at the initial period of operation seems to be mainly due to the plastic deformation of the soft metal in conformity with the shaft and, to a lesser degree, to the wear of the soft metal as it conforms to the shaft. However, the plastic deformation of the overlay is limited by its material property. The problem of local-contact seizure is likely to occur at points of contact between the overlay and the shaft under the present situation of engine operation and machining accuracy of the engine parts. More specifically, since a mechanical test under static conditions has revealed that the maximum limit of plastic deformation is from 50 to 80%, the local contact, which is approximately of the same degree as this limit, cannot be absorbed by the plastic deformation.

DISCLOSURE OF THE INVENTION

It is therefore an object of the present invention to improve the compatibility of the aluminum-based bearing alloy, thereby enhancing seizure resistance and fatigue resistance.

The sliding bearing material according to the present invention is characterized in that a coating layer consisting of from 90 to 55% by weight of a solid lubricant and from 10 to 45% by weight of a polyimide binder is formed on the surface of the aluminum-based bearing alloy.

The construction of the present invention is explained in detail.

The aluminum-based bearing alloys according to the present invention contain one or more of 10% (percentage hereinafter is weight percentage unless otherwise specified) of Cr, Si, Mn, Sb, Sr, Fe, Ni, Mo, Ti, W, Zr, V, Cu, Mg, and Zn, and 20% or less of one or more of Sn, Pb, In, Tl, and Bi. Since these alloys have high strength along with high fatigue resistance, they are particularly appropriate for use in the lining of a bearing, which is required to be fatigue-resistant.

The polyimide-resin binder of the coating layer formed on the lining bonds the solid lubricant. Furthermore, the compatibility function due to wear is shown as the polyimide-resin binder is shaved off by the shaft. The polyimide-resin binder has an extremely stable anti-corrosion property. Although resins in general have similar properties, the coating layer wears off excessively unless the heat-resistance and wear-resistance properties attain a certain level. Is Since the properties of phenol are poor under the conditions of high speed sliding, phenol resins are not used. Aromatic polyimide, polyether imide, and aromatic polyamide imide can be used as the polyimide resin. These resins may be modified with isocyanate, DAPI, DONA, or a sulfon group to provide varnish, which can be used as the polyimide resin. When the quantity of the polyimide binder is less than 10%, the bonding strength is insufficient thereby increasing the wear. On the other hand, when the quantity of the polyimide binder exceeds 45%, the coefficient of friction is enhanced so that seizure becomes likely to occur. The quantity of the polyimide binder is therefore in the range of from 10 to 45%, preferably from 20 to 30%.

$MoS_2$, BN, $WS_2$, graphite or the like can be used as the solid lubricants. These solid lubricants have the function of lowering and stabilizing the coefficient of friction. In order to fully exhibit this function, the solid lubricant used is preferably fine particles of 2 microns or less, particularly 1 μm or less in average diameter. When the quantity of the solid lubricant is less than 55%, the friction properties are not excellent, and seizure is likely to occur. On the other hand, at more than 90%, the adhesion strength is poor and hence the wear is increased. The quantity of the solid lubricant is in the range of from 5 to 90%, preferably from 70 to 80%.

The coating layer may be two or more layers having different compositions of the polyimide and/or solid lubricant.

Two or more coating layers may be of different colors. When the sliding bearing materials have different colors, it is possible to investigate and specify the place, depth, and number of the local-contact and the causes thereof and to feed back the obtained information to the design of the bearing and the shaft.

When the quantity of the friction-adjusting agent is less than 2%, it is not effective for wear resistance. At a quantity of more than 20%, the opposed material is worn out by the friction-adjusting agent. The friction agent is $CrO_3$, $Fe_3O_4$, PbO, $WS_2$, ZnO, CdO, $Al_2O_3$, SiC, $Si_3N_4$ or the like and can replace 1–20% of the above-mentioned solid lubricant. These friction-adjusting agents are added in a case where the wear of the coating layer is excessive through adding only the solid lubricant. In order to fully exhibit such friction-adjusting function, the friction-adjusting agent of 2 μm or less in average particle diameter is preferably used.

A method for forming the coating layer is hereinafter described.

Aluminum bearing-alloy, which is the workpiece, is worked into the form of bearing lining. The workpiece is subsequently subjected to degreasing in an alkaline solution, such as the caustic soda. Alkali, which is deposited on the surface of the workpiece, is then removed by water rinsing and hot-water rinsing. The surface of the lining may be roughened after the degreasing by a combination of alkali-etching and pickling, when the adhesion of the coating layer is required to be high or when it is undesirable to expose a broad area of the lining during the use of a bearing. Alternatively, a roughened surface may be formed on the lining after drilling or the like. When it is necessary to further enhance the adhesion, a 0.1–5 μm thick chemical conversion film consisting of zinc phosphate or zinc-calcium phosphate may be formed on the surface of a lining. It is possible to obtain a coating having extremely high adhesion by means of combining the substrate-treatment and chemical conversion. Subsequently, hot-water rinsing and then warm air drying are carried out. The solid lubricant or the like diluted with an appropriate diluting agent together with the polyimide resin are sprayed and applied on the lining, and are dried and fired at 150°–300° C. Such methods as tumbling, dipping and brushing are possible as well as spraying. The coating layer is preferably from 1 to 25 μm thick, more preferably from 1 to 8 μm thick.

The inventive bearing material exhibits improved fatigue resistance and seizure resistance under the local contact condition as compared with the conventional material consisting only of the lining. When the surface of a conventional material was observed after the test, great flow, roughening and traces of local melting were observed on the surface where the local contact occurred. It was therefore confirmed that Si, Cr and the like, which were the hard materials for strengthening the aluminum alloy, are not effective against seizure due to the local contact. On the other hand, it was confirmed that the inventive coating material, which is softer than the hard materials, conformed well to the convex form of a shaft which is subject to the local contact. In addition, when the coating layer was used but the Al alloy used for the lining did not contain Cr and Si but contained only Sn, Cu, And Pb, the compatibility was good, but fatigue cracks occurred at places where the coating layer. The fatigue resistance thus was unsatisfactory.

BEST MODE FOR CARRYING OUT THE INVENTION

Figure 1:
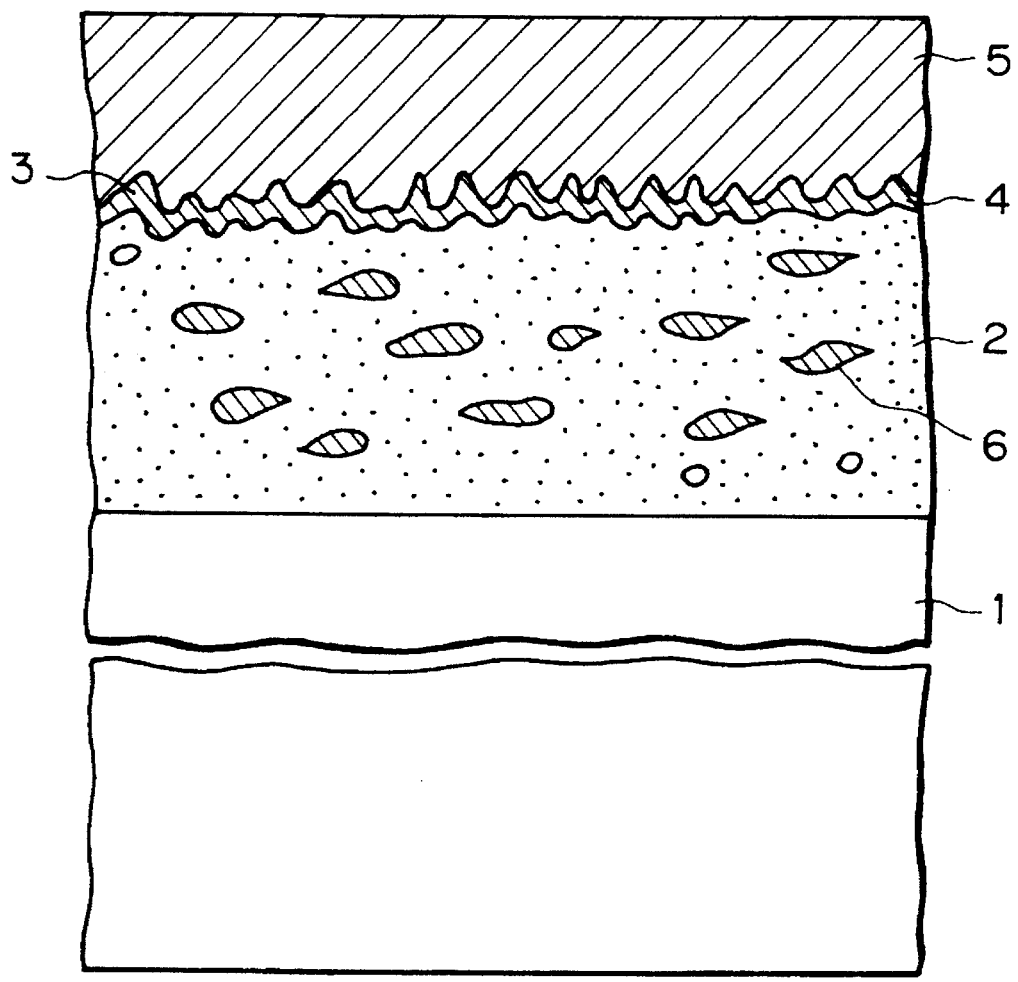
FIG. 1 is a cross-sectional view of a sliding bearing according to an example of the present invention.

The cross-section of a sliding bearing according to an example of the present invention is schematically shown in FIG. 1.

The backing metal 1 is 1.2 mm thick and consists of SPCC. The aluminum bearing-alloy 2 is 0.3 mm thick and consists of a bearing aluminum-alloy (Al-12Sn-1.8Pb-1.0Cu-3.0Si-0.3Cr). The surface 3 is treated by alkali-etching and pickling to provide a roughened substrate with 4.5 μm of roughness Rz. The adhesion layer 4 is 1 μm thick zinc phosphate layer. The coating layer is denoted by 5. The phases of soft metal such as Sn, Pb or the like are denoted by 6.

Various bearing materials shown in Table 1 were subjected to the tests of fatigue-resistance, seizure-resistance and wear-resistance. The performances of the bearing material with only the lining and without the coating layer as the conventional material were also tested. The testing conditions were as follows.

Fatigue Test

A hardened S50C shaft is provided with a 5 μm convexity at both ends and a concavity at the middle. The shaft is pressed against the test bearing-materials at a surface pressure of 300 kg/cm$^2$ and rotated at 800 rpm. SAE 10W30 is used as the lubricating oil.

Seizure Test

A shim 10 μm×3 mm×10 mm in size is inserted between the test bearing materials and a housing to provide a crown on the test bearing materials. The test bearing materials are brought into contact with a round shaft of hardened S50C and is rotated at 1500 rpm. Load is increased by 50 kg/cm$^2$ every 10 minutes. SAE 10W30 is used as the lubricating oil.

Wear Test

The performance of the bearing materials is tested under the condition, where the local contact generates as described above.

TABLE 1

| | Polyimide | | Solid Lubricant | | | Friction-Adjusting | | Fatigue Time | Seizure Surface-Pressure | Wear Amount |
|---|---|---|---|---|---|---|---|---|---|---|
| No. | PI | PAI | MoS$_2$ | BN | WS$_2$ | Cr | Agent | (h) | (kg/cm$^2$) | (μm) |
| 1 | 10 | — | 90 | — | — | — | — | 15 | 600 | 7 |
| 2 | 25 | — | 70 | 5 | — | — | — | 19 | 500 | 5 |
| 3 | 30 | — | 70 | — | — | — | — | 20 | 600 | 5 |
| 4 | — | 30 | 70 | — | — | — | — | 19.5 | 500 | 6 |
| 5 | 20 | 10 | 60 | — | — | 10 | — | 16 | 450 | 5 |
| 6 | 30 | — | 40 | 10 | 10 | 10 | — | 17.5 | 450 | 6 |
| 7 | 30 | — | 50 | — | 20 | — | — | 19 | 550 | 5 |
| 8 | 35 | — | — | 40 | — | 25 | — | 17 | 450 | 4 |
| 9 | 45 | — | 55 | — | — | — | — | 14 | 400 | 4 |

TABLE 1-continued

| | Polyimide | | Solid Lubricant | | | Friction-Adjusting | Fatigue Time | Seizure Surface-Pressure | Wear Amount |
|---|---|---|---|---|---|---|---|---|---|
| No. | PI | PAI | MoS$_2$ | BN | WS$_2$ | Cr Agent | (h) | (kg/cm$^2$) | (μm) |
| 10 | 10 | — | 75 | — | — | — CrO$_3$ = 15 | 18.5 | 500 | 6 |
| 11 | 20 | — | 50 | — | — | 20 SiO$_2$ = 5, SiC = 5 | 16 | 450 | 3 |
| 12 | 30 | — | 60 | — | — | — Al$_2$O$_3$ = 10 | 15.5 | 450 | 3 |
| 13 | — | 30 | — | 35 | 30 | — PbO = 5 | 15 | 500 | 5 |
| 14 | 20 | 10 | 30 | 10 | 10 | 10 Note 1 | 14.5 | 450 | 4 |
| 15 | 10 | 20 | 50 | 10 | — | — Si$_3$N$_4$ = 10 | 16 | 500 | 3 |
| 16 | 30 | — | 60 | — | — | — Note 5 | 17.5 | 550 | 4 |
| 17 | 30 | — | 65 | — | — | — PbO = 3 | 18 | 550 | 5 |
| 18 | 28 | — | 60 | — | — | — CrO$_3$ = 12 | 14.5 | 400 | 4 |
| 19 | 35 | — | 60 | — | — | — SiO$_2$ = 5 | 16 | 500 | 3 |
| 20 | 44 | — | 55 | — | — | — CrO$_3$ = 1 | 15 | 400 | 3 |
| 21 | | | Only aluminum bearing-alloy (Note 2) | | | | 3.5 | 150 | 1 |
| 22 | | | Aluminum bearing-alloy (Note 3) + overlay (Note 4) | | | | 15 | 350 | 5 |

Note 1: CrO$_3$ = 2, Fe$_3$O$_4$, PbO, ZnO, CdO, Al$_2$O$_3$, SiO$_2$, SiC, Si$_3$N$_4$ 1% each
Note 2: Al—11Sn—1.8Pb—1.0Cu—3.0Si—0.3Cr
Note 3: Al—11Sn—1.8Pb—1.0Cu—3.0Si—0.3Cr
Note 4: Pb—10Sn—2Cu
Note 5: CrO$_3$ = 5, PbO = 4, Al$_2$O$_3$ = 1

As is apparent from Table 1, the inventive sliding-bearings exhibit excellent performance as compared with the conventional aluminum bearing-alloys without or with an overlay.

Next shown in Table 2 are the results of tests to investigate the bearing performance with regard to the presence or absence of the substrate-treatment and bonding layer and the kind used.

As is apparent from Table 2, performance is further enhanced by carrying out the substrate-treatment and forming the bonding layer.

TABLE 2

| | Structure | | Substrate | Bonding | Fatigue Time | Seizure Surface-Pressur |
|---|---|---|---|---|---|---|
| No. | PI | MoS$_2$ | Treatment | Layer | (h) | (kg/cm$^2$) |
| 23 | 30 | 70 | none | none | 14 | 450 |
| 24 | 30 | 70 | Alkali etching-pickling | none | 18 | 550 |
| 25 | 30 | 70 | Boring | none | 16 | 500 |
| 26 | 30 | 70 | none | Zinc phosphate | 17 | 450 |
| 27 | 30 | 70 | none | Zinc calcium phosphate | 18 | 500 |
| 28 | 30 | 70 | Alkali etching-pickling | Zinc phosphate | 20 | 600 |
| 29 | 30 | 70 | Alkali etching-pickling | Zinc calcium phosphate | 20 | 650 |
| 30 | 30 | 70 | Alkali etching-pickling + Boring | Zinc phosphate | 23 | 650 |
| 31 | 30 | 70 | Alkali etching-pickling + Boring | Zinc calcium phosphate | 23 | 700 |

Industrial Applicability

As is described hereinabove, the present invention enhances the compatibility of an aluminum bearing-alloy and can therefore provide a bearing having improved performance as automobile bearings.

Furthermore, even if the machining accuracy of a shaft and a bearing remains as heretofore and, hence, an local contact occurs, the bearing provided has improved properties and can prevent both seizure and fatigue.

We claim:

1. A sliding-bearing material comprising:

an aluminum bearing alloy, whose surface is roughened by alkali-etching and pickling and is covered by a phosphate layer, said aluminum bearing alloy consisting essentially of 10 wt. % or less of at least one element selected from the group consisting of Mn, Sb, Sr, Fe, Mo, Ti, W, Zr, V, Cu, Mg and Zn; 20 wt. % or less of at least one element selected from the group consisting of Sn, Pb, In, Tl, and Bi, and balance aluminum, and said phosphate consisting of one member selected from the group consisting of Zn phosphate and Zn-Ca phosphate;

a coating layer formed on said phosphate layer and consisting of from 90 to 55% by weight of a solid lubricant and from 10 to 45% by weight of a polyimide binder.

2. A sliding-bearing material according to claim 1, wherein the solid lubricant includes from 1 to 20% by weight of a friction adjusting agent different from the solid lubricant.

3. A sliding-bearing material according to claim 2, wherein the polyimide binder is in a quantity of from 20 to 30% by weight.

4. A sliding bearing according to claim 1, wherein the surface of the aluminum-bearing alloy is drilled, and the drilled surface is roughened by the alkali etching and the pickling.

5. A sliding-bearing material according to claim 1 wherein the coating is from 1 to 2.5 μm thick.

6. A sliding bearing material according to claim 5, wherein unevenness formed by etching has a depth of 4.5 μm.

7. A sliding bearing according to claim 6, wherein the solid lubricant is at least one member selected from the group consisting of $MoS_2$, BN, $WS_2$ and graphite.

8. A sliding-bearing material according to claim 3 wherein the coating is from 1 to 25 μm thick.

9. A sliding bearing material according to claim 8, wherein unevenness formed by the etching has a depth of 4.5 μm.

10. A sliding bearing according to claim 9, wherein the solid lubricant is at least one member selected from the group consisting of $MoS_2$, BN, $WS_2$ and graphite.

11. A sliding-bearing material according to claim 2 wherein the coating is from 1 to 25 μm thick.

12. A sliding bearing material according to claim 11, wherein unevenness formed by the etching has a depth of 4.5 μm.

13. A sliding bearing according to claim 12, wherein the solid lubricant is at least one member selected from the group consisting of $MoS_2$, BN, $WS_2$ and graphite.

14. A sliding-bearing material according to claim 4 wherein the coating is from 1 to 25 μm thick.

15. A sliding bearing material according to claim 14, wherein unevenness formed by the etching has a depth of 4.5 μm.

16. A sliding bearing according to claim 15, wherein the solid lubricant is at least one member selected from the group consisting of $MoS_2$, BN, $WS_2$ and graphite.

\* \* \* \* \*